Figure 1:
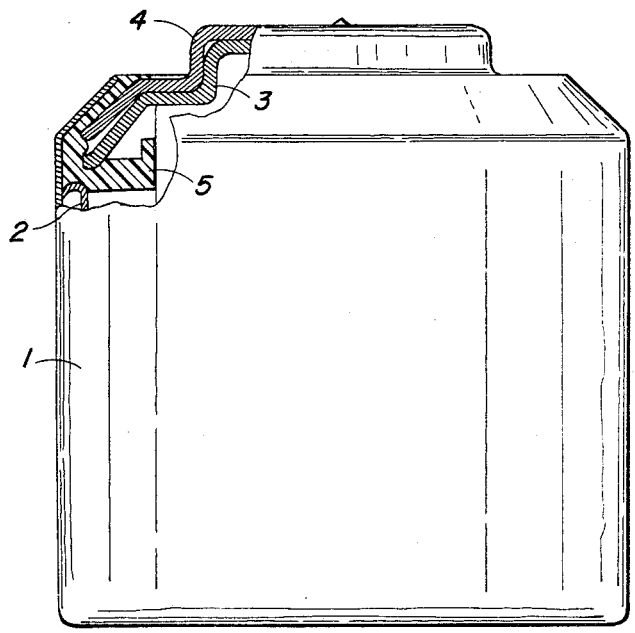

June 11, 1968   G. E. KINDIG ET AL   3,388,006

ALKALINE BATTERY PROVIDED WITH A TERMINAL PROTECTION PLATE

Filed Sept. 21, 1966

GUILFORD E. KINDIG
HAROLD L. MALONE
INVENTORS

BY Daniel E. Sagow
Robert W Hampton
ATTORNEYS 3,388,006
ALKALINE BATTERY PROVIDED WITH A
TERMINAL PROTECTION PLATE
Guilford E. Kindig and Harold L. Malone, Rochester,
N.Y., assignors to Eastman Kodak Company, Rochester, N.Y., a corporation of New Jersey
Filed Sept. 21, 1966, Ser. No. 580,960
2 Claims. (Cl. 136—163)

This invention relates to a battery of the alkaline type, and more specifically, to an improved cap construction for an alkaline battery wherein an air space is provided for the purpose of trapping escaped electrolytic salts and preventing migration of the salts to the surface of a contact.

In prior art alkaline batteries, the electrolyte would travel by capillary action along the edges of the seal until it got to the top-connecting cap of the battery. Through exposure to the air the electrolyte would change to electrolytic salts which would further migrate along the surface of the connecting cap to where they covered the cap. Since the electrolytic salts are not conductors, this would insulate the cap from a connector which was intended to be in contact with the cap, which would make the battery appear to be faulty.

It is therefore an object of the invention to improve the top cap construction of alkaline batteries so that the migration of electrolytic salts from the battery to the top cap connection is materially reduced. Another object of the invention is to provide a longer life for the alkaline battery, and to minimize maintenance, such as cleaning off the top-connecting cap so as to keep the battery in operation.

These and other objects of the invention are accomplished by providing an additional sheet of metal on top of the cap connection of the battery, the sheet having its edges extending beyond the edges of the top cap connection, so as to provide an air space between the top cap and the washer so that the salts have a much longer path to take before getting to the connecting surface.

Figure 2:
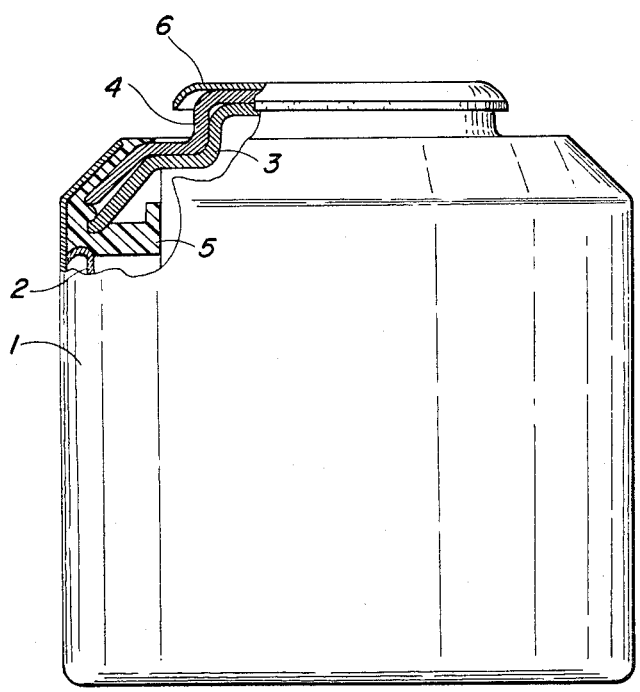

The invention will better be understood by reference to the drawing wherein:

FIG. 1 shows a battery partly in section having a top cap construction of prior art alkaline batteries, and FIG. 2 shows a battery partly in section having a top cap construction of an alkaline battery according to the invention.

Referring to the drawings in which corresponding parts have been identified with the same number, there is shown in FIG. 1, a prior art alkaline battery. This type of battery consists of an inner can 2 surrounded by an outer can 1, the outer can being the connection for the cathode terminal of the battery. Inside of the inner can is an anode, which is not shown, which is connected to inner top disk 3. Above inner top disk 3 is an outer top disk 4. The outer top disk 4 serves as the anode connection for the battery. Between the outside can 1 and the two top disks is a plastic grommet 5 which serves as a seal to keep the electrolyte in the two cans and to keep air out. This plastic grommet extends on both sides of the outer top disk 4 and on the upper side of inner top disk 3 and partially on the lower side of inner top disk 3. During manufacture, plastic grommet 5 is squeezed by the outside can up against the two top disks to form a tight seal.

There have been difficulties with this construction because the electrolyte has migrated by capillary action along the lower surface of the inner top disk 3, around its outside corner, up the upper surface of the inner top disk 3, until it gets to the lower surface of the outer top disk 4, back down the lower surface of top disk 4 to its edge, around the corner and on the upper surface of outer top disk 4 onto the uppermost portion of top disk 4 which serves as the anode contact. Since the salts of the electrolyte are insulators, the battery appears to be defective, since current cannot flow from the anode contact to the device being used. This general type of prior art battery is more fully described in U.S. Patent 2,712,565, issued July 5, 1955, to Williams.

It has been found that the addition of a sheet of metal on top of the outer top disk, said sheet extending beyond the edges of said outer top disk, serves to eliminate this migration of electrolyte with subsequent deposition of electrolytic salts on the anode top disk. In FIG. 2, there is shown a top cap assembly according to the invention. Here a metal sheet 6 has been welded to the outer top disk. This sheet 6 extends beyond the edges of the outer top disk, and defines an air space therebetween. As a result, any electrolyte creeping along the top surface of the outer top disk will be exposed to the air before it reaches the top surface of metal sheet 6. As a result, the electrolyte will be reduced to its salts at the underside of sheet 6. Once the salts are solid, they become very brittle and will fall off as they round the corner at the edge of sheet 6. Therefore, the salts do not accumulate on the top surface of sheet 6 and thus, the surface of sheet 6 remains as an efficient conductor.

Various materials could be used for the metal sheet 6; however, it has been found that the most efficacious material has been stainless steel.

This invention has been described in detail with particular reference to preferred embodiments thereof, but it will be understood that variations and modifications can be effected within the spirit and scope of the invention as described hereinabove and as defined in the appended claims.

We claim:
1. In an alkaline battery of the type having an outer can and a top disk wherein said outer can and top disk are insulated from each other by a seal, the improvement comprising a sheet of conductive material conductively attached to said top disk, said sheet of conductive material extending beyond the edges of the uppermost surface of said top disk to provide an air space between said conductive sheet and said top disk.

2. A battery as in claim 1 which further comprises an alkaline electrolyte and in which said sheet of conductive material consists essentially of stainless steel.

References Cited
UNITED STATES PATENTS
3,096,217    7/1963    Clune _____ 136—133 XR
FOREIGN PATENTS
312,810    6/1929    Great Britain.
617,756    2/1949    Great Britain.

WINSTON A. DOUGLAS, Primary Examiner.
D. L. WALTON, Assistant Examiner.